Aug. 3, 1965     G. E. WILLIAMSON     3,197,803
HANDLE
Filed July 24, 1963
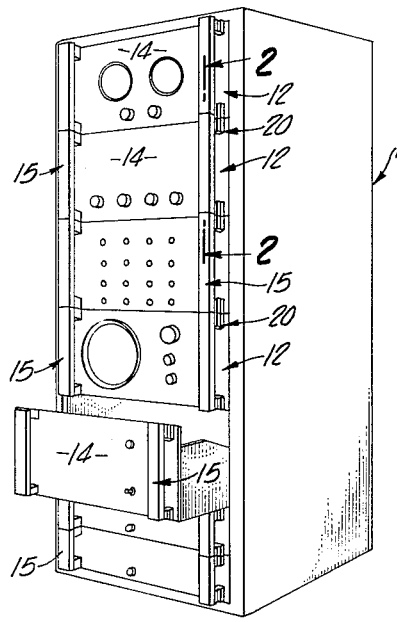
FIG. 1.
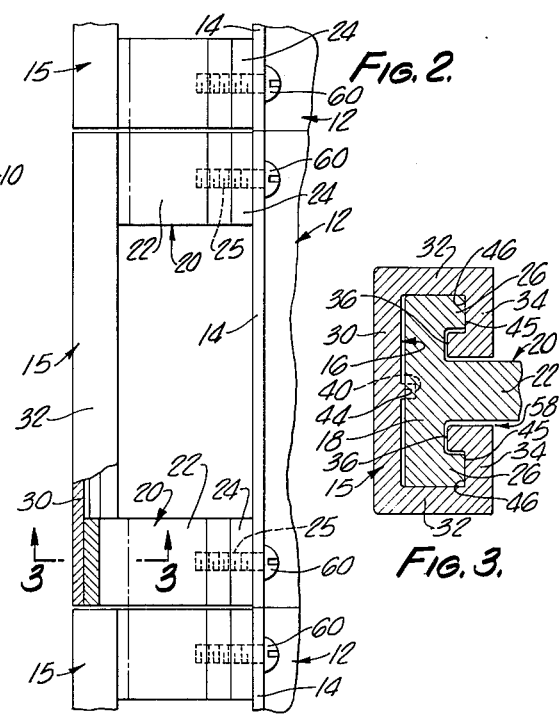
FIG. 2.
FIG. 3.
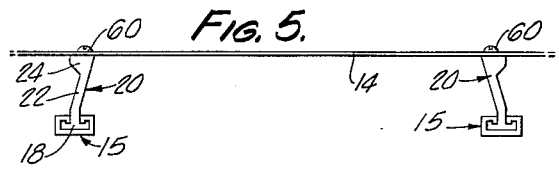
FIG. 5.
FIG. 4.
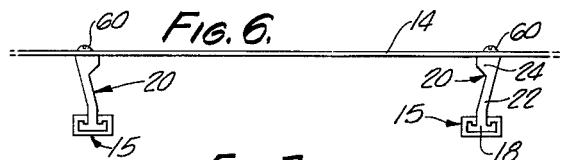
FIG. 6.
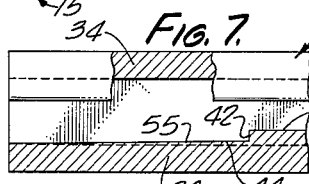
FIG. 7.
FIG. 4A.
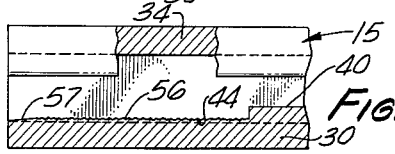
FIG. 8.
INVENTOR.
GLENN E. WILLIAMSON
BY
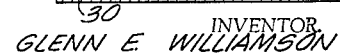
ATTORNEY

United States Patent Office 3,197,803
Patented Aug. 3, 1965

3,197,803
HANDLE
Glenn E. Williamson, Oxnard, Calif., assignor to Analytic Systems Company, Pasadena, Calif., a corporation of California
Filed July 24, 1963, Ser. No. 297,313
10 Claims. (Cl. 16—111)

This invention relates to handles, and more particularly to handles attachable to panels at the fronts of drawers or trays or slide-out chassis employed in racks or cabinets of electrical and similar equipment, and to the fronts of other drawers, as well as to doors, and often referred to as drawer pulls when used for manipulating drawers. The present structure is especially adapted to the production of handles which are elongated.

An object of the invention is to produce drawer pulls mountable upon the front panels of drawers, such as subassemblies of equipment mounted on an equipment rack.

In the drawer pulls of this invention elongated handle elements of uniform cross-section are cut from elongated extrusions of such cross-section to the desired lengths and supported on such panels through the medium of outstanding spacers or standards disposed at the ends of the handle elements.

Another object of the invention is to produce handle structures made of parts which may be easily extruded from aluminum and cut into lengths appropriate for assembly for handles of different lengths.

Another object of the invention is to provide handle structures of the indicated nature which may be rigidly assembled together by press fitting and then quickly secured to such panels as by screws.

A still further object is to provide for the production of handles from extruded metal shapes which will require a minimum of machine work and yet render all structures firm and rigid.

Other objects of the invention and various features of construction thereof will become apparent to those skilled in the art upon reference to the following specification and the accompanying drawing wherein certain preferred embodiments of the invention are illustrated.

In the drawings:

FIG. 1 is perspective view of a cabinet containing drawers, or subassembies, to which handles of the present improvement are attached;

FIG. 2 is in part a fragmentary elevational view, parts being shown in section, illustrating positioning of handles of this invention, the view being taken in the direction of the arrows of the section line 2—2 of FIG. 1;

FIG. 3 is an enlarged cross-sectional detail taken on the line 3—3 of FIG. 2;

FIG. 4 is an exploded detail perspective of two parts of a handle of this improvement, a portion of the handle element being broken away to facilitate illustration;

FIG. 4a is another exploded detail view partly in section and partly in elevational detail to illustrate a slight modification;

FIG. 5 illustrates one arrangement of spacers with respect to a handle element;

FIG. 6 illustrates another possible arrangement of spacers and a handle element;

FIG. 7 is in part a sectional detail and in part an elevational detail showing a slight modification of the construction at the ends of a handle element; and FIG. 8 is a similar view illustrating a further slight modification.

In the drawing, FIG. 1 illustrates a cabinet 10 which may be a metal cabinet and in which a plurality of drawers 12 are slidably mounted, each such drawer having a front panel 14. Each drawer panel 14 is illustrated as having a handle combination of this improvement affixed in vertical position at each of the opposite sides of the drawer. In the specific appilcation of the invention the drawers are in the form of a slideout chassis upon which various subassemblies of electronic components are mounted. The chassis are mounted on a rack and can be independently drawn or slid outwardly on corresponding tracks and returned to their normal position in which they are located when in use. In FIG. 1, one of the drawers having electronic gear mounted thereon is shown drawn partially outwardly toward a position where easy access to all the parts mounted on that drawer may be had.

Each handle includes an elongated handle element 15, provided with a longitudinally extening channel 16. At each end of each handle element 15, the respective channel 16 receives a foot or base 18 of a generally T-shaped spacer or standard 20. The handle elements 15 and spacers 20 are readily produced as aluminum extrusions, such extrusions being then cut into appropriate lengths. Thus, the channeled handle elements 15 are cut from extrusions into lengths equaling the heights of respective drawers, and the spacers 20 are cut from extrusions as short lengths to be fitted into the opposite ends of the channels 16 of the handle elements 15.

In addition to the base or foot 18 of each spacer 20, the T-shaped structure embodies also a shank 22 integral with the base or foot 18. The opposite end of each shank 22 is integrally provided with a somewhat enlarged head 24 whose outer face is provided with a threaded opening 25 for the reception of a screw for mounting the assembled handle structure subsequently.

The base 18 of each spacer 20 is shaped to slide into an end of the channel 16 of the respective handle element 15, and includes at its opposite sides upstanding flanges 26 which act as guides or positioning elements to maintain the desired relationship of the parts when assembled. Each channeled handle element 15 includes a bottom wall 30 provided with integral side walls 32 at its opposite edges, the side walls 32 being provided with overhanging retaining walls 34 directed toward each other above the channel 16. The opposing ends of the overhanging walls 34 may be provided with downturned flanges 36 to engage behind the oppositeiy directed positioning flanges 26 of the cooperating spacer 20. Thus, the outer face of the foot or base 18 of the spacer 20 is disposed in opposed relationship to the inner bottom wall 38 of the channel 16.

Integrally formed in the channel element 15, is an outstanding longitudinally extending rib 40 located along the median line of the bottom wall 38 of the channeled handle element 15. At a distance back from the end of the channeled element 15 equal to the length of the cooperating base 18 of the spacer 20, the end of the rib 40 is cut away to form an outwardly directed shoulder 42 for abutment against the adjacent end portion of the respective spacer 20 to act as a stop when in assembled position. The machining to provide the shoulder 42 is carefully accomplished to leave a shallow upstanding rib portion 44 which will permit the pressing of the respective spacer 20 into a tight press fit against the shoulder 42 substantially as indicated in FIG. 3 where outer faces 45 of the flanges 26 on the base 18 engage along corresponding inner faces 46 on the undersides of the overhanging walls 34 of the channeled handle element 15. A tight frictional relationship of the parts is thus produced and maintained, and the shoulder 42 limit introduction of the bases 18 of the spacers 20 so that the outer end portions of both members at the ends of the assembly are in flush relationship as indicated in the lower portion of FIG. 2 where the handles 15 of two underlying drawers 12 are aligned. To facilitate assembly when accomplishing the rigid press fit relationship desired, the machining many include beveling of the outer end of each shallow rib portion 44 as indicated at 50 in FIG. 4a or forming a beveled notch 52 in the opposing edge portion of the adjacent end wall of the respective spacer base 18, or forming both beveled portions 50 and 52.

Another means for facilitating the press fit assembly is illustrated in FIG. 7 wherein the shallow rib portion 44 is machined to produce a slightly inclined plane or wall 55, so that the production of the friction fit during installation of the handle parts is progressive.

A still further means for accomplishing the indicated frictional press fit is illustrated at 56 in FIG. 8 wherein the outer extremity 57 of the rib portion 44 is beveled and the upper face of such rib portion is machined in knurled or serrated form approximately as represented.

By any of the means indicated in FIGS. 4, 4a, 7 and 8, a tight press fit is readily accomplished when the bases 18 of the respective spacers 20 are forced into position against the respective shoulders 42. The shanks 22 move freely into the slot 58 existing between the flanges 36 of each handle element 15. An assembled unit is easily mountable in position on a drawer panel 14 by means of screws 60 attached to the heads 24 of the spacers 20 by being fitted into the screw holes 25 upon insertion from the inside of the drawer through holes in the drawer panel 14, as indicated.

In the preferred configuration of the spacers 20 as illustrated in FIG. 4, the shank or web 22 of each spacer is offset to one side from the perpendicular to its base 18. Thereby, variations in relative arrangements of the channeled handle elements 15 laterally with respect to the drawer 12 and spacers 20 may be readily effected. Thus, as illustrated in FIG. 5 the webs or shanks 22 may be inclined away from each other; or as indicated in FIG. 6, they may be leaned toward each other. This arrangement makes it possible also to dispose adjacent handle elements 15 out of vertical alignment with each other if desired. This may be accomplished merely by turning an assembly end for end, or by interchanging the two handle assemblies at opposite ends of a drawer panel 14.

Since aluminum extrusions are sufficiently yieldable for the indicated purposes, the required described press fits between the ends of the handle elements 15 and the respective spacers 20 are very easily accomplished, especially because machining the ends of the upstanding ribs 40 to produce the shoulders 42 and the shallow rib portion 44 in the various configurations indicated is simple and easily accomplished. These aluminum extrusions are also easily finished by such means as anodizing, or painting by spraying, brushing or otherwise, or finished in any other manner desired to yield any special color.

It will be additionally noted that by the indicated constructions and arrangements, handles or drawer pulls may be readily produced and assembled in rigid relationships and the products readily installed, so that the handle elements 15 stand out from the surfaces to which they are attached and provide for grasping the handles with the fingers positioned between the handle elements and the walls to which they are attached. This is of considerable importance when drawers are laden with quantities of heavy materials and require firm grasping and steady pulling to draw them outward into desired accessible positions. Again, when deemed desirable, so much of one end portion of the outstanding rib 40 of a handle element may be machined away when producing the shoulders 42 that one spacer 20 may be loose at one end of each handle, a tight fit of the other spacer being relied upon at the other end to retain the respective handle element 15 properly installed. In any event, the shanks 22 of the spacers 20, ride into their installed position in the ends of the slot 58 resulting between the opposed flanges 36 of the handle element 15.

It will be apparent from the foregoing description that the handle elements 15 are easily aligned and that the ends of adjacent handle elements and the adjacent spacers 20 at those ends are readily juxtaposed in abutting but non-contacting relationship to provide a structure of single, monolithic appearance. This result may be easily achieved with this invention even though the drawers be of different heights.

Though only a few specific embodiments of this invention has been described herein, it will be understood that the invention may be embodied in other forms and using other materials, and may be applied in other ways, within the scope of the appended claims.

The invention claimed is:

1. A handle structure including:
   an elongated handle element defining a channel therealong and a longitudinal slot along one side and opening from said channel, said element defining a bottom and side walls of said channel and having a rib upstanding from the bottom of said channel between said side walls;
   a spacer having a base mounted against said rib and in said channel and having a shank outstanding from said base through said slot; and
   means carried by said handle structure for mounting such structure on an object.

2. A handle structure as in claim 1 wherein a portion of said rib presents a shoulder positioning said base in the channel against the rib.

3. A handle structure as in claim 1 wherein a portion of said rib presents a shoulder to position said base in the channel and said rib provides a shallow portion upon which said base has a tight friction fit.

4. A handle structure as in claim 1 wherein said rib provides an upstanding shoulder in said channel, and said base is slidable in said channel to abut against said shoulder as a stop.

5. A handle structure including:
   an elongated handle element defining a channel therealong and a slot along one side of said channel and opening from said channel;
   upstanding stop means on said handle element and in said channel;
   a spacer having a base slidably mounted in said channel to abut against said upstanding stop means, said spacer having a shank projecting from said slot;
   and means carried by said shank for attachment to an object.

6. A handle structure including:
   an elongated handle element defining a channel therealong and a longitudinal slot in one side of the element opening into said channel, said element defining a bottom and side walls of said channel and having an upstanding rib at the bottom of said channel between said side walls;
   and a spacer at each end of said channel and having a base mounted in said channel upon said rib and having a shank outstanding through said slot from said base, the projecting portions of said spacers having means for attachment of the handle structure to an object.

7. A handle structure as in claim 6 wherein the ends of said rib provide shoulders for positioning said bases thereagainst.

8. A handle structure as in claim 7 wherein shallow portions of said rib are provided upstanding from said rib adjacent said shoulders, and said bases are bound in position against said shallow portions by a forced fit.

9. A handle structure as in claim 8 wherein projecting portions of said spacers have means providing for attachment thereof to an object.

10. A handle structure including:
    an elongated handle element defining a channel therealong and slot means therealong opening from said channel on one side;

upstanding means in said channel and on said handle element adjacent each end;

a spacer at each end of said channel having a base slidably mounted therein to abut said upstanding means, each spacer base having a shank outstanding through and slidable in said slot means;

and means carried by each shank for attachment to an object.

References Cited by the Examiner

UNITED STATES PATENTS

| | | | |
|---|---|---|---|
| 1,546,251 | 7/25 | Possons | 16—111 |
| 1,652,018 | 12/27 | Kubelka | 16—111 |

FOREIGN PATENTS

| | | |
|---|---|---|
| 547,659 | 9/42 | Great Britain. |
| 822,787 | 10/59 | Great Britain. |

DONLEY J. STOCKING, *Primary Examiner.*